United States Patent
Ladd et al.

(10) Patent No.: US 8,055,288 B2
(45) Date of Patent: Nov. 8, 2011

(54) SYSTEM AND METHOD FOR DISTRIBUTING ACCURATE TIME AND FREQUENCY OVER A NETWORK

(75) Inventors: Jonathan Ladd, Bridgewater, NH (US); Patrick C. Fenton, Calgary (CA)

(73) Assignee: NovAtel Inc., Calgary (CA)

( * ) Notice: Subject to any disclaimer, the term of this patent is extended or adjusted under 35 U.S.C. 154(b) by 400 days.

(21) Appl. No.: 12/263,940

(22) Filed: Nov. 3, 2008

(65) Prior Publication Data

US 2009/0117928 A1    May 7, 2009

Related U.S. Application Data

(60) Provisional application No. 60/985,036, filed on Nov. 2, 2007.

(51) Int. Cl.
  H04B 7/00 (2006.01)
  H04B 15/00 (2006.01)

(52) U.S. Cl. .................. 455/502; 455/456.1; 455/3.01; 455/67.11

(58) Field of Classification Search .............. 455/502, 455/456.1, 67.11, 3.02, 3.01, 414.2, 452.1, 455/509, 63.1, 67.16, 3.03; 342/463; 370/485, 370/480, 204, 265; 375/261, 259, 325
See application file for complete search history.

(56) References Cited

U.S. PATENT DOCUMENTS

| 3,742,498 A | 6/1973 | Dunn |
| 3,787,862 A | 1/1974 | Jacobson |
| 5,663,735 A | 9/1997 | Eshenbach |
| 5,786,773 A | 7/1998 | Murphy |
| 5,945,948 A | 8/1999 | Buford et al. |
| 6,212,475 B1 | 4/2001 | France et al. |
| 6,492,945 B2 * | 12/2002 | Counselman et al. ........ 342/464 |
| 6,556,942 B1 | 4/2003 | Smith |
| 6,560,535 B2 | 5/2003 | Hohman et al. |

(Continued)

FOREIGN PATENT DOCUMENTS

CA    2 398 781    5/2002

(Continued)

*Primary Examiner* — John J Lee
(74) *Attorney, Agent, or Firm* — Cesari and McKenna, LLP; Patricia A. Sheehan

(57) ABSTRACT

A system to distribute accurate time and/or frequency over a network utilizing signals of opportunity transmitted by one or more local transmitters with known locations, the system includes a base receiver with a clock synchronized to a reference time scale such as GNSS or UTC time that saves a series of samples of the signals of opportunity and time tags the series with a calculated time of broadcast. A remote receiver saves samples of the signals of opportunity and correlates the series with the saved samples. The remote receiver calculates a time of transmission of saved samples that correspond to the series, determines a time offset as a difference in the time of broadcast calculated at the remote receiver and the time of broadcast calculated at the base receiver, and determines the time offset with respect to the base receiver. The base receiver further or instead phase locks to the signal opportunity and at predetermined intervals determines phase measurements of the integrated carrier frequency of the signal of opportunity and provides the phase information to the remote receiver. The remote receiver, which is also phase locked to the same signal of opportunity, uses the phase measurement information to frequency lock its clock to the base receiver clock by determining a frequency error based on the rate of change of phase measurements made at the base receiver and the remote receiver.

31 Claims, 2 Drawing Sheets

U.S. PATENT DOCUMENTS

| | | |
|---|---|---|
| 7,405,694 B1 | 7/2008 | Hwang et al. |
| 7,511,662 B2 | 3/2009 | Mathews et al. |
| 7,511,667 B2 | 3/2009 | Matsuoka et al. |
| 7,576,690 B2 | 8/2009 | Vollath |
| 2001/0009563 A1 | 7/2001 | Kohli et al. |
| 2001/0050633 A1 | 12/2001 | Thomas |
| 2003/0058163 A1 | 3/2003 | Zimmerman et al. |
| 2003/0072356 A1 | 4/2003 | Abraham et al. |
| 2003/0085839 A1 | 5/2003 | Zhodzishky et al. |
| 2004/0130485 A1 | 7/2004 | Rapoport et al. |
| 2004/0207556 A1* | 10/2004 | Spilker et al. ............... 342/464 |
| 2005/0057395 A1 | 3/2005 | Atkinson et al. |
| 2005/0197769 A1 | 9/2005 | Soehren et al. |
| 2005/0201421 A1 | 9/2005 | Bhandari et al. |
| 2007/0050824 A1* | 3/2007 | Lee et al. ..................... 725/81 |
| 2007/0182633 A1 | 8/2007 | Omura et al. |
| 2007/0241960 A1 | 10/2007 | Feller |
| 2007/0282565 A1 | 12/2007 | Bye et al. |
| 2009/0256750 A1 | 10/2009 | Mathews et al. |

FOREIGN PATENT DOCUMENTS

| | | |
|---|---|---|
| EP | 0747721 | 12/1996 |
| EP | 1 254 545 | 10/2007 |
| GB | 2353648 | 2/2001 |
| WO | WO 97/28455 | 8/1997 |
| WO | WO 99/48233 | 9/1999 |

* cited by examiner

SYSTEM AND METHOD FOR DISTRIBUTING ACCURATE TIME AND FREQUENCY OVER A NETWORK

CROSS REFERENCE TO RELATED APPLICATIONS

This application claims priority from U.S. Provisional Patent Application Ser. No. 60/985,036 filed Nov. 2, 2007.

BACKGROUND OF THE INVENTION

1. Field of the Invention

The invention relates generally to systems and methods for distributing accurate time and frequency for networked receivers and, in particular, to systems for distributing time and frequency through the use of radiated "signals of opportunity," such as local radio or television signals.

2. Background Information

Timing is critical for networks, for example, in high speed wireless networks in which handoffs occur. Another example of network in which timing is critical is a city power distribution network in which high voltage direct current (DC) transmission lines are used to transfer power over long distances between power generation facilities, such as hydroelectric dams, and consumers. The high voltage DC power signals must be converted to low voltage AC power signals before distribution to businesses and households. Cities generally have a number of power transformer stations that are interconnected on power grids to do the conversion. The interconnected power transformer stations must be producing the low voltage AC power signals in exactly the same frequency and phase before the signals can be distributed across common low voltage transmission lines. Accordingly, the power transformer station operations must be synchronized in time and frequency. There is thus a need for accurate time determination as well as accurate frequency determination at distributed, or remote, locations within the network.

GNSS receivers at the remote locations can provide timing and frequency information, as long as the antennas at the remote locations have sufficiently clear views of the sky. However, remote locations that are within cities often do not have such views of the sky, and there is thus a need for providing timing and frequency information at the remote locations.

SUMMARY OF THE INVENTION

A method and system for providing timing information at distributed, or remote, receivers uses radiated signals of opportunity, such as, AM and FM radio signals, television signals, signals from geo-stationary communications satellites and so forth, that can be received simultaneously by the base and remote receivers, to determine time and frequency offsets from the time and frequency determined at a base station, where the source of the time and/or frequency to be distributed is located. Based on the measured offsets, the remote receivers determine their relative time and frequency differences from the base station and take appropriate action such as correcting their clocks to more closely align in phase and frequency to that of the clock at the base station.

The base station and remote receivers know their respective locations and the location of the signal of opportunity transmitter (referred to herein also as the "SOP transmitter"). The base station, which has an accurate time clock that is synchronized to the reference clock to be distributed, such as GNSS or UTC time, takes a series of samples of the broadcast signal of opportunity, determines the time of transmission based on the time delay associated with transmission over the known baseline between the base station and the SOP transmitter, and time tags the samples. The base station then transmits the time tagged series of samples.

During overlapping time periods, the remote receivers store samples of the broadcast signals. The remote receivers then correlate the time tagged series of samples with the stored signal samples, and determine a time of transmission of the saved signals that correspond to the series, taking into account the delay over the known baselines between the respective remote receivers and the SOP transmitter. The remote receivers determine their phase clock errors from the time difference between times of transmission calculated at the respective remote receivers and the base receivers. The remote receivers thus maintain time within microseconds of the base receiver time, which may be tied to the reference time such as GNSS or UTC time.

For tighter timing and in particular frequency requirements, the base station monitors the frequency of the broadcast signal of opportunity and determines an associated phase error, that is, the phase differences between the registered broadcast frequency of the SOP transmitter and the actual broadcast frequency. The base station utilizes its reference frequency control, and thus the base station determines the phase differences between the actual frequency of the broadcast signal and the reference frequency. The base station transmits the phase error information to the remote receivers, which use the phase error information to phase lock to the reference frequency. The frequency synchronization precision over the network using the common signal of opportunity source, can then be accurate to within nanoseconds/second.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
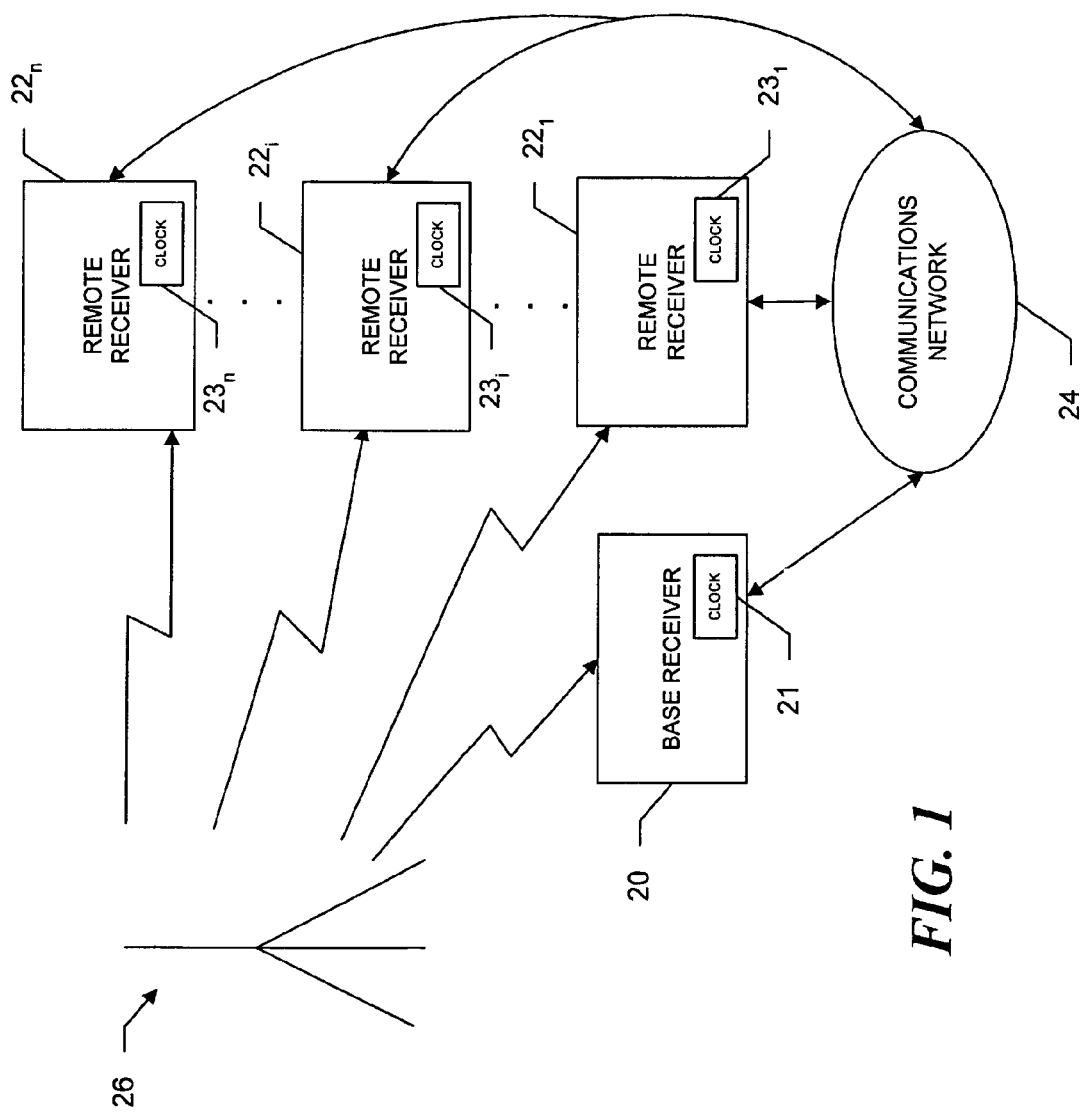
FIG. 1 is a functional block diagram of a system constructed in accordance with the invention.

Referring to FIG. 1, a reference, or base station 20 (referred to hereinafter as "the base receiver") and remote receivers $22_1 \ldots 22_n$ are connected to a communication network 24, such as, for example, the internet, or a private network. Each of the receivers simultaneously receives a signal broadcast from one or more high power radiators 26 with known locations, i.e., AM/FM radio transmitters, Beacon or Loran transmitters, television station transmitters, geo-stationary communications satellites, and so forth, with respective service areas that cover all or part of the network. The broadcast signals, which are selected due to their quality of signal, known transmission locations, and continuous broadcast, are "signals of opportunity", that is, signals that are broadcast at various frequencies and for purposes such as the transmission of random conversation or dialog. This is in contrast to GNSS signals, for example, which are broadcast at the same frequencies by the GNSS satellites and carry particular codes. Further, in contrast to known systems, the current system does not utilize the data or content of information modulated onto the broadcast signals, that is, does not, for example, utilize transmitted time of day information contained in the broadcast signals. The terrestrial radiator is referred to hereinafter as the "SOP transmitter."

The base receiver 20 in one embodiment uses a GNSS receiver to provide the reference time and frequency for the network. Because of the use of GNSS receiver, the base receiver is located such that it has a sufficiently clear view of the sky to determine GNSS time using GNSS satellite signals. The base receiver 20, operating in a known manner, then synchronizes its clock 21 to the GNSS or UTC time based on the GNSS satellite signals. Preferably, the base receiver has a sufficiently clear view to also determine its position using the GNSS satellite signals. Otherwise, the X, Y, Z position coordinates of the base receiver must be known by, for example, GNSS satellite information obtained from a hand held GPS receiver during installation of the base receiver, through a survey, and/or through use of topological maps.

The locations of the remote receivers $22_1 \ldots 22_n$ are also known. In certain applications, the street addresses of the remote receivers are sufficient. For more precise applications, the locations must be known to within tighter tolerances by, for example, GNSS satellite information obtained from a hand held GPS receiver during installation of the remote receivers, through survey, or through the use of topological maps.

The location of the SOP transmitter 26 is usually known or can be readily determined from the information provided by a registration authority, such as, for example, the U.S. Federal Communications Commission or the FCC. The information may be available, for example, over the internet. The network 24 may provide the base and remote receivers with a list of usable local signals of opportunity, or the system may select a particular signal of opportunity, for example, for the stability of its carrier frequency, its modulated frequency content and based on the field strength of the signal at the respective receivers. In addition, for redundancy, the signals from more than one SOP transmitter may be utilized.

Notably, the broadcast signals are of sufficiently low frequency to have excellent building penetration. Thus the remote receivers need not have particularly good views of the sky, but instead must have relatively good reception of the selected broadcast signals of opportunity. Further, the use of such low frequency signals allows the receivers to scan with configurable front end filters, such as charged capacitor filters or digital FIR filters, to find the best signal of opportunity candidates.

The base receiver 20, with its position known or determined using the GNSS satellite signals, can readily determine a baseline to the selected SOP transmitter 26. Similarly, the remote receivers $22_1 \ldots 22_n$, using their known locations, can readily determine respective baselines to the selected SOP transmitter. If the SOP transmitter is far away with respect to a baseline between the base and remote receiver, the direction vector may be utilized instead of the baseline between the receivers and the SOP transmitter. From the base lines, the SOP signal propagation or travel times between the broadcast antenna and the receivers can be calculated and used to further improve the time synchronization as described below.

Figure 2:
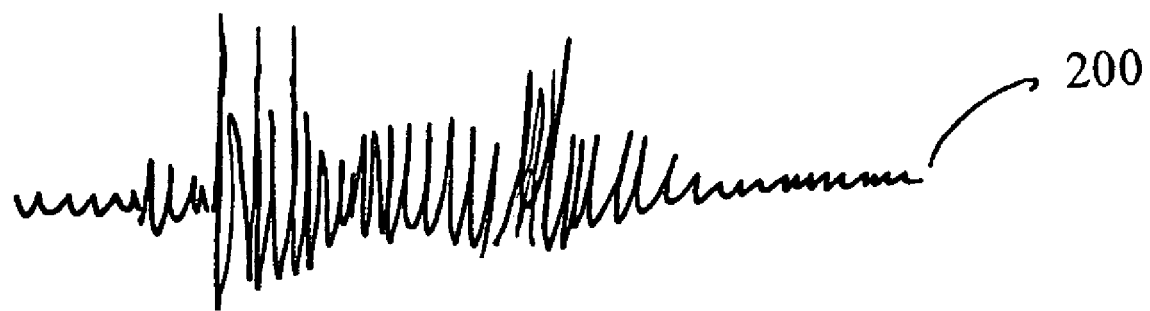
FIG. 2 illustrates a snapshot of a signal of opportunity.

Referring also to FIG. 2, the base receiver 20 takes a series of samples 200 of the broadcast signal of opportunity and time tags the samples. The series may be a fraction of a second long or longer, for example, ¼ second long. The base receiver may take the samples continuously or at predetermined times, as appropriate.

To time tag the samples, the base receiver determines their respective times of transmission. The base receiver thus subtracts the time delay associated with the transmission of the signal from the SOP transmitter 26 to the base receiver from the time provided by the clock 21 for receipt of the samples and time tags the samples with the broadcast time. The receiver may, for example, time tag each of the samples of the series. Alternatively, the base receiver may time tag the first sample of the snapshot, or certain of the samples of the series. The base receiver 20 then transmits the time tagged series of samples to the remote receivers $22_1 \ldots 22_n$ over the communication network 24. As appropriate, the base receiver may compress the information for ease of transmission over the communication network.

The remote receivers $22_1 \ldots 22_n$ are similarly saving and time tagging samples of the broadcast signals of opportunity based on their local clocks $23_1 \ldots 23_n$. To time tag the samples, the remote receiver subtracts the time delay associated with the transmission from the SOP transmitter 26 to the remote receiver from the time the corresponding signal was received at the remote receiver, to determine the broadcast time. The remote receivers may save samples of signal segments that have the same length or are slightly longer than the series of samples, as appropriate, to ensure capture of corresponding signal samples. A given remote receiver $22_i$ correlates the series of samples received from the base receiver, with the saved time-tagged data such that the signal samples align. The time difference between the broadcast time of the series according to the remote receiver and according to the base receiver is the clock error, or time offset, at the remote receiver.

Using the time offset, the remote receiver $22_i$ aligns its time with the base time, i.e., the time determined at the base receiver, which may have its clock synchronized to GNSS or UTC time. The base receiver continues to send time-tagged series to the remote receiver, to ensure continued time alignment to within one or a small number of microseconds.

The remote receivers $22_1 \ldots 22_n$ determine the time offsets using received series of samples 200 that have diverse frequency content, such as series that correspond to a change in the broadcast signal that is distinct from the background signal and is not regularly repeated, such as, for example, a particular bit of conversation. These series represent "modulation events," and the alignment of the saved and received modulation events produce a correlation function that has an essentially triangular shape, that is, a correlation function with a single correlation peak. The series that correspond to repeating sounds, such as, for example, certain musical segments, are not utilized to determine time offsets because the associated correlation function has multiple peaks and a time offset can thus not be determined with sufficient accuracy.

The remote receiver $22_i$ sequentially correlates the received series of samples 200, or modulation event, with the saved time-tagged signal sample data and selects the saved data that produces the highest correlation value. The remote receiver then determines the time offset as discussed above. The time offset value is verified by repeating the process with subsequent modulation events provided by the base receiver 20.

The samples taken at the base receiver 20 and a given remote receiver $22_i$ may be taken at slightly different times, since the samples are taken with respect to the receivers' clocks. Accordingly, the accuracy of the time alignment with a correlation process that relies on the best fit, i.e., selecting the highest correlation value, is essentially limited by the sampling rate. For increased accuracy, fine adjustments may be made to the phase of the demodulation sample collection process, to drive the sampling times at the remote receiver closer to the sampling times at the base receiver.

The remote receiver $22_i$ determines if the correlation values on either side of the correlation function peak, that is, earlier and later correlation values, are essentially symmetrical. If not, the remote receiver shifts the phase of the sample collection process, that is, a sample clock, in the direction of the larger of the earlier or later correlation values. The remote receiver may shift the phase by a predetermined amount each time it performs the analysis. Alternatively, the remote receiver may shift the phase by an amount that corresponds to the magnitude of the differences in the earlier and later correlation values. Before determining if the earlier and later correlation output values are essentially symmetrical, the remote receiver $22_i$ may filter the correlation output values by, for example, averaging them over successive series, before making the comparisons.

The accuracy of the alignment depends on the broadcast modulated frequency content and bandwidth of the selected signal of opportunity, the broadcast signal to noise ratio and the filtering bandwidth of the early and late correlation parameters. Using, for example, a typical AM radio talk-show broadcast with 5 kHz of bandwidth and average noise as the signal of opportunity, and sampling at a rate of 10 KHz the remote receiver $22_i$ can, with the fine adjustment of the phase of the sampling collection process, align the remote receiver time to within 1 microsecond of the base receiver time, that is, with the reference time such as GNSS or UTC. If a television broadcast with 100 kHz of bandwidth and average noise is instead selected as the signal of opportunity, the remote receiver may align its time with absolute time to within less than 1 microsecond.

For applications with even tighter frequency synchronization requirements, the base receiver 20 may instead or in addition provide the remote receiver $22_i$ with phase information associated with the broadcast signal of opportunity, such that the remote receiver can phase lock to the base reference frequency. To do this, the base receiver, operating in a known manner, uses its chosen reference frequency source, such as GPS satellite information, to determine a true clock frequency. The base receiver then phase locks to the broadcast signal of opportunity and continuously integrates the apparent frequency of the SOP carrier. Periodically, at for example every 1 second, the base receiver measures the value of the accumulating frequency integration, to provide an SOP phase measurement that includes integer and fractional carrier cycle components. The phase measurements are made at predetermined intervals, such as at second intervals with respect to the reference time and frequency.

The fractional cycle component can be measured accurately, however, the integer cycle component has an arbitrary start value, which must be assigned by the base receiver. The base receiver 20 has used its clock 21, which may be GNSS-tied frequency control, to determine the timing of the phase measurements, and thus, the phase measurements are based on the reference frequency to be distributed. The base receiver provides phase information, which includes the integer and fractional carrier cycle components to the remote receivers $22_1 \ldots 22_n$, the time of the measurement, and information identifying the SOP transmitter, such as station identifier, nominal station frequency and so forth. In addition, the base receiver may send information relating to the quality of the signal and/or the base receiver tracking operation such as signal to noise ratio, number of seconds from acquisition, last lock break, or cycle slip and so forth.

A given remote receiver $22_i$ similarly phase locks to the broadcast signal of opportunity, and similarly continuously integrates its perceived SOP carrier frequency, and similarly periodically samples the phase of the SOP frequency integration process at a sample rate derived from the reference frequency of the remote receiver. The remote receiver compares its SOP phase measurements with that of the base receiver to establish the frequency difference between the base and remote receivers. Based on a first count received from the base receiver, the remote receiver sets its integer cycle count to the count set by the base receiver and adjusts the frequency of its clock such that the phase measurements at the remote are the same as at the base. The remote receiver determines frequency error as the rate of change between the phase measurements made at the base and at the remote receiver, based on subsequent phase measurement received from the base receiver. The remote receiver then synchronizes its clock frequency to the frequency of the base receiver clock, that is, to the reference frequency, using the calculated frequency errors.

The system may operate to determine synchronous frequency over the network, with or without determining absolute time. The remote receivers may, for example, not require absolute time and use instead less accurate time determined from another source or an arbitrary time. If the remote receivers are also synchronizing to the reference time, the base and remote receivers can use carrier cycle counts to identify the modulation events from which synchronization to absolute time is determined. Providing the correlation method utilizing the series of samples 200 is able to synchronize the times between the base receiver and the remote receiver to better than ½ wave length of the SOP carrier, the integer ambiguity of the cycle count of the remote receiver can be resolved and set to exactly match the base. When ambiguity resolved carrier is used to make the clock and frequency adjustments, the time and frequency accuracy at the remote receivers can be maintained within nanoseconds and nanoseconds/second of the reference time and frequency, such as GNSS or UTC time.

With information from the base receiver relating to the quality of the tracking operations at the base, the remote may further improve its time synchronization by, for example, using only the highest quality pairs of measurements, that is, measurements that are of high quality at both the base and the remote receivers. Alternatively or in addition, the remote receiver may weight the measurement differences by the quality of information in a least squares solution based on redundant measurements. Further, the quality information may cause a remote receiver that is tracking a single SOP signal to switch to another SOP signal.

The system described herein has the advantage of accurate time and frequency transfer between a base receiver and remote receivers utilizing broadcast signals of opportunity. The communication network may be wired or wireless. The known location of the SOP transmitter may be a trajectory rather than a fixed location. For example, the SOP transmitter may transmit from a moving platform such as an automobile, aircraft, ship or satellite, provided that the location and the velocity vector of the transmitter can be determined by the system. For a satellite transmitter, for example, the orbital ephemeris parameters must be readily available. One or more of the remote receivers may also receive GNSS satellite signals and determine position. The GNSS remote receivers may be mobile or fixed-position receivers. The base and remote receivers may determine phase error measurements by down-converting the received signal of opportunity to base band using the nominal registered frequency for the transmitter or to some other lower frequency, determining a residual frequency offset, and integrating the down converted frequency offset to calculate the phase error measurement. The remote receivers then determine a frequency offset based on the differences in the phase measurements made at the base receiver and at the remote receiver. By downconverting to determine the phase measurements, the integer cycle count values do not grow as large and therefore are more efficient to process and require less bandwidth to communicate to the remote receivers.

What is claimed is:

1. A system for transferring time over a network utilizing signals of opportunity transmitted by one or more transmitters with known locations, the system comprising:
 a base receiver with a clock synchronized to a reference time that samples the signals of opportunity, time tags the samples with a calculated time of broadcast, and sends a series of the time-tagged samples over a communications network, the base receiver calculating the time of broadcast based on the time of receipt of the signal that corresponds to the series of samples and a time delay associated with a base line from the transmitter to the base receiver;
 a remote receiver that receives information over the communications network, the remote receiver
  saving and time-tagging samples of the signals of opportunity,
  correlating the time-tagged series of samples received over the communications network with the saved time-tagged samples,
  calculating a time of broadcast of the saved time-tagged samples that correspond to the received series of samples,
  determining a time offset as a difference in the time of broadcast calculated at the remote receiver and the time of broadcast calculated at the base receiver, and
  determining the time with respect to the reference time at base receiver based on the time offset.

2. The system of claim 1 wherein the remote receiver calculates the time of broadcast based on the time of receipt of the signal that corresponds to the series of samples at the remote receiver and a time delay associated with a baseline from the remote receiver to the transmitter.

3. The system of claim 1 further including
 the base receiver synchronizing clock frequency to a reference source, determining carrier phase measurements associated with the broadcast signals of opportunity and providing phase information to the remote receiver, and
 the remote receiver having a clock and determining carrier phase measurements associated with the broadcast signals of opportunity, the remote receiver determining a frequency offset of the clock from the base receiver clock frequency by the differences between the phase measurements of the base and remote receivers, and
 the remote receiver using the frequency offset measurements to adjust and align its clock frequency to that of the base.

4. The system of claim 3 wherein
 the base and remote receivers determine the phase measurements by phase locking to the broadcast signals of opportunity and integrating the frequency to produce a wave count that represents an accumulating phase of the broadcast frequency associated with the transmitter and measuring the wave count at predetermined times according to the reference frequencies of the respective receivers.

5. The system of claim 3 wherein
 the base and remote receivers determine the phase measurements by downconverting the broadcast signals of opportunity using a down converting frequency source generated from the respective receivers reference frequencies and integrating the residual frequency to produce wave counts that represent the frequency offset of the signal of opportunity from the down converting frequency as measured at predetermined times according to the reference frequency.

6. The system of claim 1 further including additional remote receivers that determine a relative time as time offsets from the base receiver time.

7. The system of claim 1 wherein the base and remote receivers utilize signals of opportunity from a plurality of the transmitters.

8. The system of claim 1 wherein one or both of the base and remote receivers include configurable front end filters that scan the broadcast signals to select one or more signal of opportunity for use.

9. The system of claim 1 wherein the communication network provides a list of usable signals of opportunity and one or both of the base and remote receivers selects one or more signals of opportunity from the list for use.

10. The system of claim 1 wherein the remote receivers adjust a phase of a sample clock based on non-symmetrical earlier and later correlation values determined during correlation of the series of samples to the saved signal samples.

11. The system of claim 10 wherein the remote receivers filter the earlier and later correlation values before making the adjustment.

12. A method for transferring relative time over a network utilizing signals of opportunity transmitted by one or more local transmitters with known locations, with signal service areas covering all or a portion of the network, the method comprising the steps of
 synchronizing a clock to a reference time scale,
 saving series of samples of the signals of opportunity at the base receiver, time tagging the series with a time of broadcast calculated using the base receiver clock, and providing the time tagged series of samples to a remote receiver, the base receiver calculating the time based on the time of receipt of the signals at the base receiver and a time delay associated with a base line from the transmitter to the base receiver;
 saving samples of the signals of opportunity at the remote receiver and correlating the received series of samples with the saved signal samples;
 calculating a time of broadcast of the signal samples that correspond to the series of samples and determining a time offset as a difference in the time of broadcast calculated at the remote receiver and the time of broadcast calculated at the base receiver, and
 determining the relative time difference between the remote and base receivers based on the time offset to determine time at the remote receiver.

13. The method of claim 12 wherein the base receiver synchronizes its clock to a global reference.

14. The method of claim 13 wherein the base receiver synchronizes its clock to one of GNSS or UTC time.

15. The method of claim 12 wherein the step of calculating the time of broadcast at the remote receiver includes calculating the time based on the time of receipt of the signals that correspond to the series of samples and a time delay associated with a base line from the remote receiver to the transmitter.

16. The method of claim 12 further including
 determining phase measurements associated with the carrier frequency of the broadcast signals of opportunity at the base receiver and providing phase measurement information to the remote receiver, and determining phase measurements associated with the broadcast signals of opportunity at the remote receiver and determining a frequency offset for which the phase measurements determined at the remote receiver correspond to the phase error determined at the base receiver, and aligning the frequency of the clock at the remote receiver with a clock at the base receiver based on the frequency offset.

17. The method of claim 16 wherein
the step of determining phase measurements at the base and remote receiver includes phase locking to the broadcast signal of opportunity, integrating the received carrier frequency of the signal of opportunity and periodically sampling the integrating value based with a time interval derived from the reference frequency.

18. The method of claim 16 wherein
the step of determining the phase measurements at the base and remote receiver includes downconverting the broadcast signal of opportunity to a lower frequency using a down converting frequency signal derived from the respective receiver reference frequencies integrating the down converted frequency and periodically sampling the integrating value based on a time interval derived from the respective receiver reference frequencies.

19. The method of claim 12 further including additional remote receivers performing the steps to determining relative time synchronization from time offsets from the base receiver time.

20. The method of claim 12 further including utilizing signals of opportunity from a plurality of transmitters at the base receiver and the remote receiver.

21. The method of claim 12 further including one or both of the base and remote receivers scanning the broadcast signals to select a signal of opportunity for use.

22. The method of claim 12 further including one or both of the base and the remote receiver selecting the signals of opportunity for use from a list of usable signals of opportunity.

23. The method of claim 12 wherein the step of sampling the signal at the remote receivers includes adjusting the phase of sampling based on non-symmetrical earlier and later correlation values determined during correlation of the snapshot to the saved signal samples.

24. The system of claim 23 wherein the step of adjusting includes filtering the earlier and later correlation values before making the adjustment.

25. A system for transferring frequency between two or more receivers over a network utilizing signals of opportunity transmitted by one or more transmitters at known locations, with signal service areas covering all or a portion of the network, the system comprising:

a base receiver with a clock synchronized to a reference frequency that phase locks to the signal of opportunity, makes phase measurements at predetermined intervals, and sends the phase measurements over a communications network;

a remote receiver that has a clock and receives information over the communications network, the remote receiver phase locking to the signal of opportunity and making phase measurements, determining a frequency offset of the remote receiver clock as a rate of change in the phase measurements made at the base receiver and at the remote receiver, and adjusting the frequency of the remote receiver clock to remove the measured offset.

26. The system of claim 25 further including additional remote receivers that are synchronized in frequency based on frequency errors determined using phase measurements received from the base receiver.

27. The system of claim 25 wherein the base and remote receivers utilize signals of opportunity from a plurality of the transmitters.

28. The system of claim 25 wherein one or both of the base and remote receivers include configurable front end filters that scan the broadcast signals to select a signal of opportunity for use.

29. The system of claim 25 wherein the communication network provides a list of usable signals of opportunity and one or both of the base and remote receivers selects one or more signal of opportunity from the list for use.

30. The system of claim 25 wherein
the base and remote receivers determine the phase measurements by phase locking to the broadcast signals of opportunity, integrating the frequency to produce a wave count that represents an accumulating phase of the broadcast frequency associated with the transmitter and measuring the wave count at predetermined times according to the reference frequencies of the respective receivers.

31. The system of claim 25 wherein
the base and remote receivers determine the phase measurements by downconverting the broadcast signals of opportunity using a down converting frequency source generated from the respective receivers reference frequencies and integrating the residual frequency to produce wave counts that represent the frequency offset of the signal of opportunity from the down converting frequency as measured at predetermined times according to the reference frequency.

* * * * *